(12) United States Patent
Siomina et al.

(10) Patent No.: US 8,780,688 B2
(45) Date of Patent: Jul. 15, 2014

(54) METHODS AND APPARATUS IN A WIRELESS COMMUNICATION SYSTEM

(75) Inventors: Iana Siomina, Solna (SE); Daniel Larsson, Solna (SE); Dirk Gerstenberger, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 745 days.

(21) Appl. No.: 12/717,222

(22) Filed: Mar. 4, 2010

(65) Prior Publication Data

US 2010/0271965 A1 Oct. 28, 2010

Related U.S. Application Data

(60) Provisional application No. 61/172,911, filed on Apr. 27, 2009, provisional application No. 61/173,357, filed on Apr. 28, 2009.

(30) Foreign Application Priority Data

Aug. 25, 2009 (SE) .................. PCT/SE2009/050951

(51) Int. Cl.
*H04J 11/00* (2006.01)
(52) U.S. Cl.
USPC .......................................... 370/203; 370/208
(58) Field of Classification Search
USPC .................. 370/203, 208, 330, 341, 349, 348
See application file for complete search history.

(56) References Cited

U.S. PATENT DOCUMENTS

| | | | |
|---|---|---|---|
| 7,912,115 B2 * | 3/2011 | Zhao et al. ...................... 375/219 |
| 7,996,032 B2 * | 8/2011 | Malladi et al. ................ 455/522 |
| 2009/0075647 A1 | 3/2009 | Lindoff et al. | |

FOREIGN PATENT DOCUMENTS

| | | |
|---|---|---|
| EP | 0594260 A1 | 4/1994 |
| EP | 1594260 A1 | 11/2005 |
| RU | 2226040 C2 | 3/2004 |
| WO | 2008/097185 A2 | 8/2008 |
| WO | 2010/138039 A1 | 12/2010 |

OTHER PUBLICATIONS

3rd Generation Partnership Project. 3GPP TS 36.211, V8.5.0 (Dec. 2008). 3rd Generation Partnership Project; Technical Specification Group Radio Access Network; Evolved Universal Terrestrial Radio Access (E-UTRA); Physical Channels and Modulation (Release 8). Dec. 2008.

3rd Generation Partnership Project. 3GPP TS 36.213, V8.6.0 (Mar. 2009). 3rd Generation Partnership Project; Technical Specification Group Radio Access Network; Evolved Universal Terrestrial Radio Access (E-UTRA); Physical layer procedures (Release 8). Mar. 2009.

(Continued)

*Primary Examiner* — Brenda H Pham
(74) *Attorney, Agent, or Firm* — Coats & Bennett, PLLC

(57) ABSTRACT

The present invention relates to methods and apparatus in a RBS and a UE for reference signal (RS) measurements in an OFDM system, that enable having a configurable RS transmission bandwidth which is smaller than the system bandwidth. This allows for better interference coordination of RS, which in turn improves the UE RS measurements used for different services such as positioning. The RBS retrieves the RS transmission bandwidth, determines a RS measurement bandwidth based on this RS transmission bandwidth, and transmits the determined bandwidth to the UE. The UE receives the RS measurement bandwidth and measures the RS in a bandwidth determined based on the received measurement bandwidth and the UE capability.

34 Claims, 12 Drawing Sheets

(56) References Cited

OTHER PUBLICATIONS

3rd Generation Partnership Project. "On OTDOA Method for LTE Positioning." TSG-RAN WG1 #56, R1-090918, Athens, Greece, Feb. 9-13, 2009.

3rd Generation Partnership Project. "Reference Signals for Low Interference Subframes in Downlink." 3GPP TSG RAN WG1 Meeting #56bis, R1-091314, Seoul, South Korea, Mar. 23-27, 2009.

Motorola: "E-UTRA Measurements Related to Mobility" 3GPP TSG RAN WG1 Meeting #47bis, Sorrento, Italy, Jan. 15-19, 2007 R1-070044.

Motorola: "E-UTRA Physical Layer Measurements" 3GPP TSG RAN WG1 Meeting #47, Riga, Latvia, Nov. 6-10, 2006 R1-063077.

Bosisio, R. et al., "Interference Coordination vs. Interference Randomization in Multicell 3GPP LTE System," Wireless Communications and Networking Conference 2008, WCNC 2008, IEEE, pp. 824-829, Mar. 31, 2008-Apr. 3, 2008.

Necker, M., "Local Interference Coordination in Cellular OFDMA Networks," Vehicular Technology Conference, 2007, IEEE, pp. 1741-1746, Sep. 30, 2007-Oct. 3, 2007.

Rahman, M. et al., "Interference Avoidance through Dynamic Downlink OFDMA Subchannel Allocation using Intercell Coordination," Vehicular Technology Conference, 2008, VTC Spring 2008, IEEE, pp. 1630-1635, May 11-14, 2008.

Won, S. et al. "Inter-Cell Interference Coordination/Avoidance for Frequency Reuse by Resource Scheduling in an OFDM-based Cellular System," Vehicular Technology Conference, 2007, VTC-2007 Fall, 2007 IEEE 66th, pp. 1722-1725, Sep. 30, 2007-Oct. 3, 2007.

\* cited by examiner

METHODS AND APPARATUS IN A WIRELESS COMMUNICATION SYSTEM

RELATED APPLICATIONS

This application claims priority under 35 U.S.C. §119(e) from the U.S. Provisional Patent Application with Ser. No. 61/172,911, filed on Apr. 27, 2009, and entitled "Flexible Bandwidth Configuration Facilitating Positioning Measurements in LTE," and from the U.S. Provisional Patent Application with Ser. No. 61/173,357, filed on Apr. 28, 2009, and entitled "Flexible Bandwidth Configuration Facilitating Positioning Measurements in LTE," and also claims priority under 35 U.S.C. §365(c) from the International Patent Application with application number PCT/SE2009/050951, filed on Aug. 25, 2009, and entitled "Methods and Arrangements in a Wireless Communications System."

TECHNICAL FIELD

The present invention relates to reference signal measurements in an OFDM system and in particular to a radio base station and a user equipment, and to a method for reference signal measurements used for e.g. positioning.

BACKGROUND

The Universal Mobile Telecommunication System (UMTS) is one of the third generation mobile communication technologies designed to succeed GSM. 3GPP Long Term Evolution (LTE) is a project within the 3$^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS system and evolved UTRAN (E-UTRAN) is the radio access network of an LTE system. As illustrated in FIG. 1, an E-UTRAN typically comprises user equipments (UE) 150 wirelessly connected to radio base stations (RBS) 100, commonly referred to as eNodeB. The eNodeB serves one or more areas referred to as cells 110.

Mobile user positioning is the process of determining UE coordinates in space. Once the coordinates are available, the position can be mapped to a certain place or location. The mapping function and the delivery of the location information on request are parts of the location service which is required for the basic emergency services. Services that further exploit the location knowledge or that are based on location knowledge to offer customers some additional value, are referred to as location-aware and location-based services, respectively.

There exist a variety of positioning techniques in wireless communications networks, differing in their accuracy, implementation cost, complexity, applicability in different environments, etc. In existing networks, the most common are UE assisted solutions where a serving mobile location center 120 (SMLC in GSM and UMTS, enhanced SMLC (eSMLC) in LTE) calculates the UE position based on measurements reported by the UE. The SMLC/eSMLC 120 is either a separate network element (as illustrated in FIG. 1) or an integrated functionality in the RBS. Among such methods, Assisted Global Positioning System (A-GPS) typically provides the best accuracy. Combining the mobile technology and GPS, A-GPS enhances the UE receiver sensitivity by providing orbit and other data to the UE. Drawbacks of A-GPS is that a GPS-equipped UE is required, and that it doesn't function in certain environments such as tunnels, indoor areas and dense urban areas. Therefore other complementing methods for positioning are needed. These methods use measurements of the time difference of arrival (TDOA) of signals between the cellular antenna and the UE. In UMTS observed TDOA (OTDOA) is used. In GSM a variant called Enhanced Observed Time Difference (E-OTD) is used.

The technique currently adopted for LTE-based positioning is OTDOA. OTDOA is a multi-lateration based technique estimating TDOA of signals received from three or more sites. To enable positioning, the UE should be able to detect signals from at least three geographically dispersed RBS. This implies that the signals need to have high enough signal-to-interference ratios (SINR). Furthermore, the signals need to be transmitted frequently enough to meet the service delay requirements. In order to meet the accuracy requirements, the signals may need to be accumulated over multiple sub frames.

There is currently no completely standardized positioning method for LTE and therefore there is no existing reference solution. To enable positioning measurements in LTE, a straightforward solution would be to measure standardized signals that are always transmitted from LTE RBS, e.g. synchronization signals (SS) or cell-specific reference signals (RS). SS and cell-specific RS (CRS) are physical signals used to support physical-layer functionality and they do not carry any information from the Medium Access Control (MAC) layer. Both signals are transmitted according to a pre-defined pattern, i.e. in selected subcarriers and time slots, and the pattern is typically relatively sparse.

In LTE, SS are transmitted in downlink and are primarily used in the cell search procedure, i.e. for the UE to identify a cell and synchronize to it in downlink in order to read the broadcast channel information. As shown in FIG. 2a, SS are transmitted in sub frame 0, 220, and sub frame 5, 230, of a radio frame 210. A SS consists of Primary SS (PSS) 240 and Secondary SS (SSS) 250. First, a cell identity is read from PSS, and then the cell identity group is read from SSS. The cell identity can then be used to determine the CRS sequence and its allocation in the time-frequency grid. In FIG. 2b, it is shown that the SS occupy 62 resource elements in the center of the allocated bandwidth.

CRS are transmitted over the entire system bandwidth and in every sub frame, i.e. more frequently than SS. In normal sub frames with a normal cyclic prefix where each time slot comprises seven OFDM symbols, CRS are transmitted on the resource elements (RE) shown in FIG. 3a, illustrating the RE 310 of a time-frequency resource grid for one sub frame 311 in time and 12 subcarriers 312 in frequency (the number of subcarriers corresponding to a physical resource block (PRB)). FIG. 3a shows the RE used for CRS 313 in a system with a single transmit antenna. In such a system, up to six different shifts in frequency (frequency reuse factor=6) and 504 different signals can be used for the CRS. With two transmit antennas, the maximum frequency reuse factor reduces to three, which is shown in FIGS. 3b and 3c. FIG. 3b illustrates the time frequency resource grid for a first antenna port, indicating the RE used for CRS for this first antenna port 313 (similar to FIG. 3a) as well as the RE reserved for CRS for the second antenna port 314. FIG. 3c illustrates the time frequency resource grid for the second antenna port, indicating the RE used for CRS for this second antenna port 316, corresponding to the reserved RE 314 in FIG. 3b, as well as the RE reserved for CRS for the first antenna port 315. With four transmit antennas, the possibilities are even more limited as shown in FIG. 3d, illustrating the time frequency resource grid for a first antenna port out of four. In FIG. 3d, the RE used for CRS for this first antenna port 317 as well as the RE reserved for CRS for the other three antenna ports 318 are indicated. Other CRS patterns are defined for sub frames with extended cyclic prefix and for multicast broadcast single frequency network (MBSFN) sub frames.

However, it has been shown that using SS and CRS for positioning without interference management would result in positioning coverage problems due to low SINR and/or insufficient number of strong signals from different RBS. The problem is particularly relevant for synchronized networks or networks with high data load, as there is a high probability of parallel transmissions in multiple cells on the RE used for CRS or SS which leads to high interference. Furthermore, the SS transmission frequency is not sufficient for the positioning requirements.

To improve positioning measurements and address the hearability problem, it has been proposed in 3GPP to introduce positioning RS (PRS), which could be designed according to transmission patterns characterized by a lower collision probability. The transmission periodicity for PRS is under discussion. In general, PRS may or may not be transmitted in multiple consecutive sub frames and the periodicity can be configured statically or semi-statically.

In respect to the frequency dimension, given a PRS transmission pattern per PRB, the simplest solution would be to repeat the same pattern in all PRB of the same sub frame, i.e., over the entire bandwidth. Transmitting PRS over a large bandwidth generally improves positioning accuracy due to a higher measurement resolution and a lower probability of being in unfavourable frequency-selective fading conditions. The drawback is that a large bandwidth gives a high UE complexity. Furthermore, a smaller bandwidth may be sufficient to achieve the required accuracy, and using the entire bandwidth is then a waste of resources.

At a high system load, there is no gain in introducing the new PRS without interference coordination. One of the approaches for reducing interference is to transmit PRS during low-interference sub frames (LIS) in which PDSCH transmissions are suppressed. FIG. 4 illustrates an example of a LIS 400 for a single cell with a possible PRS pattern, where the data transmission is suppressed in all PRB 440 of the entire transmission bandwidth of the cell 450. In the LIS 400, there are RE used for PRS 410, RE used for control signalling 420, but the rest of the REs are free from data transmission 430. To achieve an even higher interference reduction, LIS can be aligned among the cells. For the LIS alignment, inter-cell coordination may or may not be needed, depending e.g. on if LIS occurrences are configured statically or dynamically. FIG. 5 illustrates an example with aligned LIS 500 for a synchronized network with three-cell sites and a frequency reuse of three for the PRS. In the frequency dimension, only one PRB per cell is illustrated. The RE used for PRS in the current cell 520 are indicated in each cell's time-frequency resource grid, together with the RE used for PRS in some other cell 530. Cells within the same re-use group (e.g. cell (1,1) and cell(2,1)) will have colliding PRS 510.

In LTE networks, some sub frames can be configured to be MBSFN sub frames. Such sub frames are utilized for multicast/broadcast transmissions such as Mobile TV, and will not be utilized initially when the service is not supported. These sub frames could thus also be considered as low-interference sub frames during which transmission of PRS would be allowed. This is only a feasible solution in the release which does not support Multimedia Broadcast Multicast Service (MBMS), and is thus not a future proof solution.

According to another approach, currently used for UMTS and discussed for LTE, special periods called idle periods downlink (IPDL) in a cell (cell IPDL) or site (site IPDL) may be used for PRS transmission. No transmission occurs during the IPDL. This approach has been used in UMTS networks, and due to the radio technology specifics it has only been considered for the entire system bandwidth. Using IPDL for the entire system bandwidth may result in inefficient resource utilization for technologies that admit larger system bandwidths and allow for transmissions over smaller parts of the bandwidth.

SUMMARY

Embodiments of the present invention advantageously enable RS measurements together with a configurable RS transmission bandwidth. The present invention allows for better interference coordination of RS and more efficient radio resource utilization, which in turn improves the UE RS measurements and thus also the different services using RS measurements, such as positioning.

In one embodiment of the present invention, a method implemented by a radio base station for reference signal, RS, measurements in an OFDM system is provided. The radio base station is configured to transmit to a user equipment over a defined system bandwidth. The method includes retrieving a RS transmission bandwidth for a cell, where the RS transmission bandwidth is smaller than the system bandwidth. The method also includes determining a RS measurement bandwidth based on the RS transmission bandwidth, and transmitting the RS measurement bandwidth to a user equipment when the RS measurement bandwidth is smaller than the RS transmission bandwidth, in order for the user equipment to measure the RS of the cell.

In another embodiment of the present invention, a method implemented by a user equipment for reference signal, RS, measurements in an OFDM system is provided. The method includes receiving an RS measurement bandwidth for a cell, where the RS measurement bandwidth is smaller than the system bandwidth, and measuring the RS of the cell in a bandwidth determined by the received RS measurement bandwidth and the user equipment capability.

In yet another embodiment of the present invention, a radio base station for an OFDM system is provided. The radio base station comprises a retrieving circuit for retrieving a RS transmission bandwidth for a cell, where the RS transmission bandwidth is smaller than the system bandwidth. It also comprises a determining circuit for determining a RS measurement bandwidth for the cell based on the RS transmission bandwidth, and a transmitter for transmitting the RS measurement bandwidth to a user equipment when the RS measurement bandwidth is smaller than the RS transmission bandwidth, in order for the user equipment to measure the RS of the cell.

In still another embodiment of the present invention, a user equipment for an OFDM system is provided. The user equipment comprises a receiver for receiving an RS measurement bandwidth for a cell, where the RS measurement bandwidth is smaller than the system bandwidth. It also comprises a measuring circuit for measuring the RS of the cell in a bandwidth determined by the received RS measurement bandwidth and the user equipment capability.

These and other embodiments of the present invention advantageously provide a flexible configuration of the RS bandwidth, which makes it possible to do more advanced interference coordination, resulting in lower interference and thus improved RS measurements. Embodiments of the present invention also measure over only a part of the system, which allows for a reduced UE complexity.

Still further, embodiments of the present invention enable more efficient utilization of LIS resources. Different services or features of LTE and its extensions may require using different LIS and reference signals. Increasing the number of LIS may be not desirable from the network performance point of view, due to the wasted capacity. Defining new specific reference signals may also be difficult in the standard. Therefore, if the measurement granularity is sufficient with a smaller bandwidth, it is more efficient to allocate the rest of the bandwidth in the same sub frame for other transmissions.

Embodiments of the present invention also give a more efficient spectrum utilization and minimize capacity loss. Yet these embodiments still enable suppression of data transmissions in sub frames, to provide low-interference conditions, as data transmissions are suppressed only in a part of the system bandwidth. This is possible due to the flexible low interference bandwidth solution.

Embodiments of the present invention further offer system flexibility. Not all of the network components transmitting reference signals are necessarily of the same type. For example, the network may have a multi-layer structure consisting of macro and micro RBS. There can also be other assisting devices, like for example devices with only a limited RBS functionality. With such a variety of network components, there is no guarantee that they all can transmit over the same bandwidth.

In addition, embodiments of the present invention address spectrum issues, e.g. by limiting transmissions of reference signals to a certain part of the bandwidth in low-interference sub frames. With the possibility of power boosting, which has been discussed in the 3GPP standardization meetings, and the flexibility in power spectral density that may lead to a higher variability in the emitted power, it may become challenging to meet all the power emission requirements (e.g. limited out-of band power emission). The flexible bandwidth allocation of embodiments of the present invention allows for a more flexible configuration, which may be helpful in addressing similar issues.

Embodiments of the present invention also provide efficient interference coordination for RS, due to flexibility in cell grouping and bandwidth allocation for the cell groups. Given that the allocated bandwidth provides a sufficient measurement granularity, multiplexing several cell groups in the same sub frame gives a gain similar to what could be obtained with a higher frequency reuse. Assigning the strongest interferers to different groups is likely to result in significantly improved measurements. Furthermore, the gain may be enough to avoid introducing IPDL into LTE, which will significantly simplify the design of the involved network elements.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
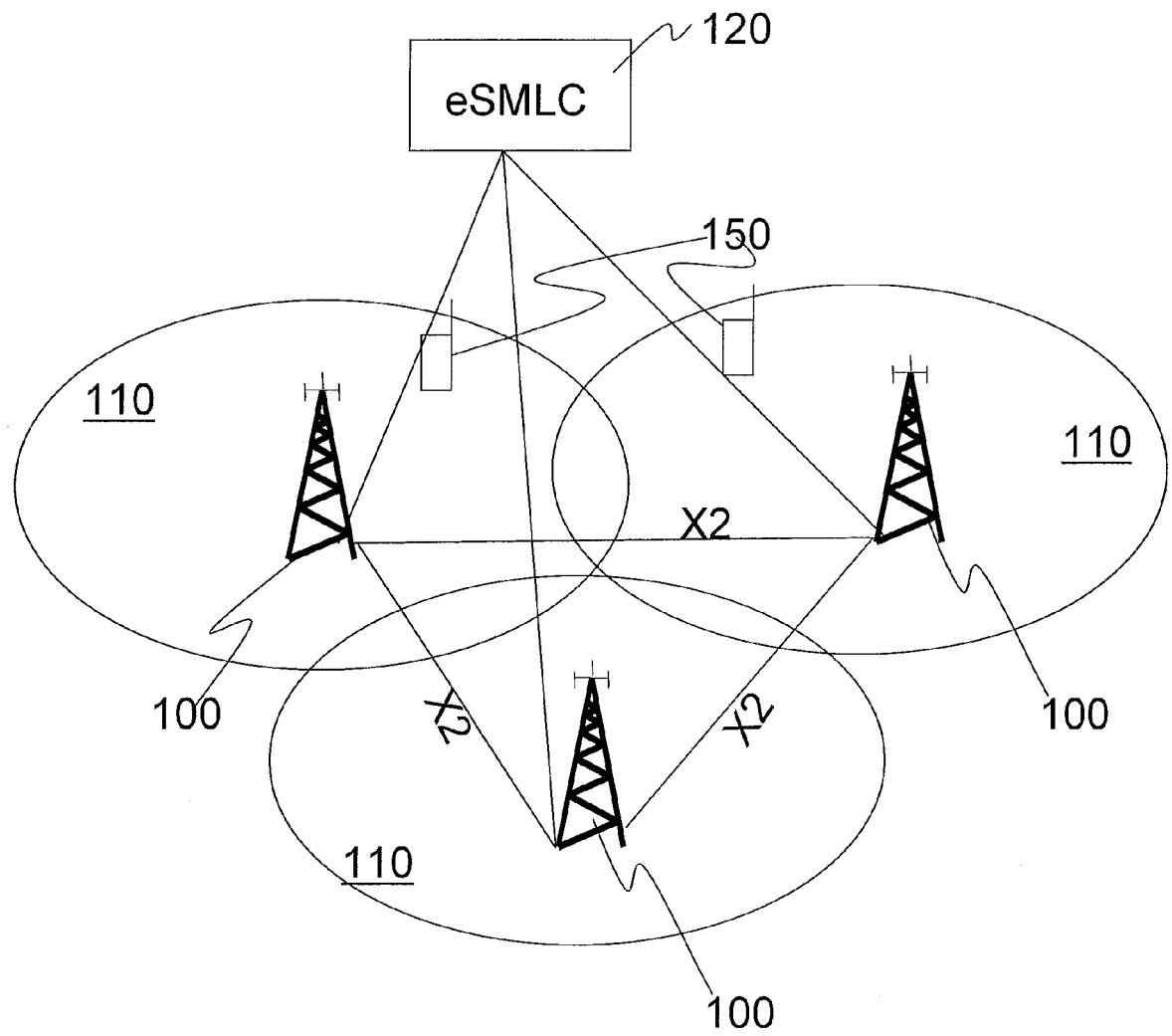
FIG. 1 illustrates schematically a part of a conventional LTE system wherein the present invention may be implemented.
Figure 2A:
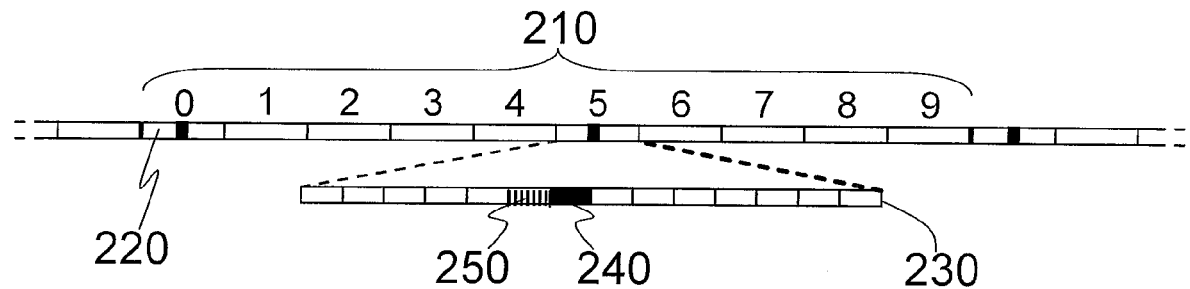
FIGS. 2a-b illustrate schematically synchronization signals in LTE.
Figure 2B:
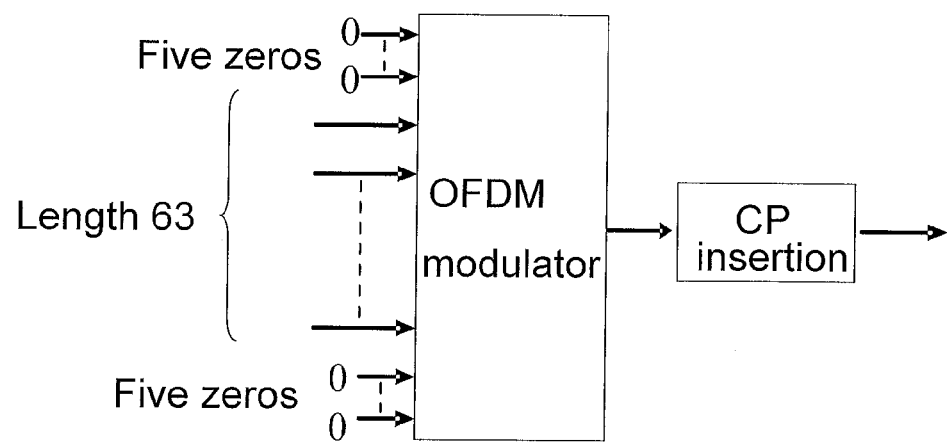
Figure 2B:
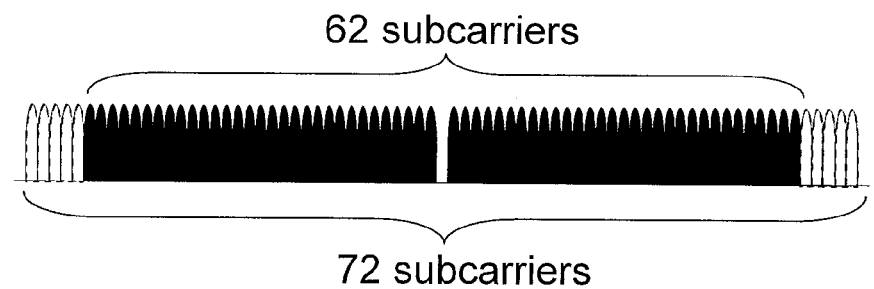
Figure 3A:
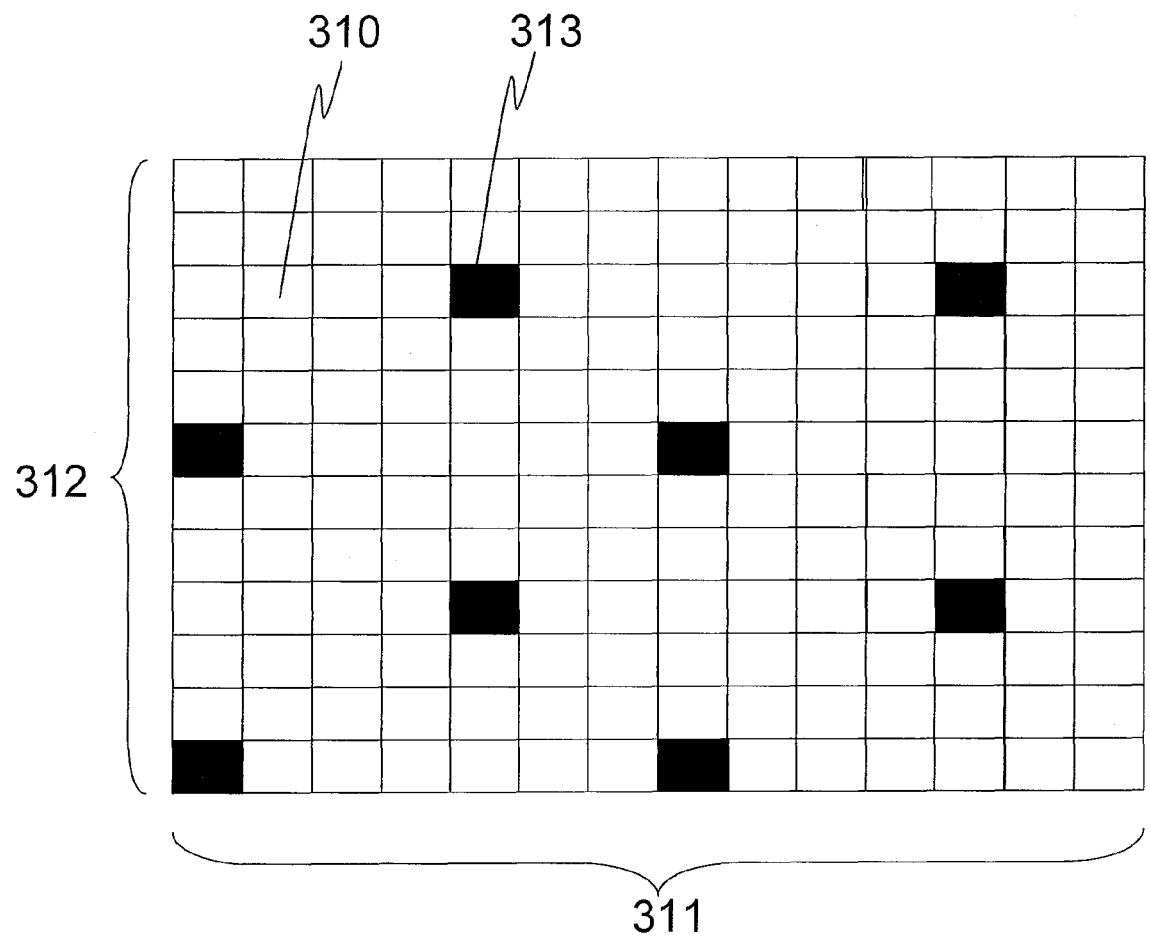
FIGS. 3a-d illustrate schematically the CRS pattern in a LTE time-frequency resource grid for different numbers of antenna ports.
Figure 3B:
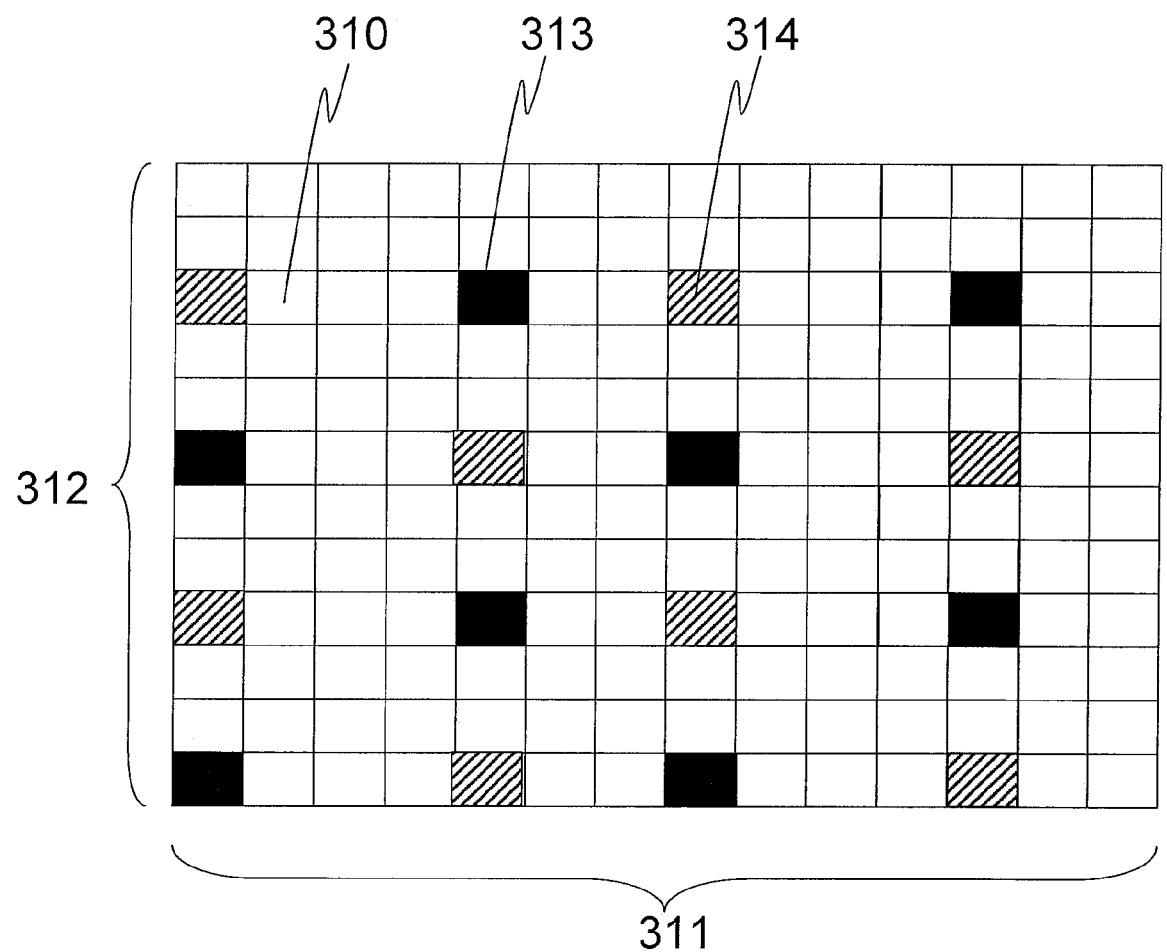
Figure 3C:
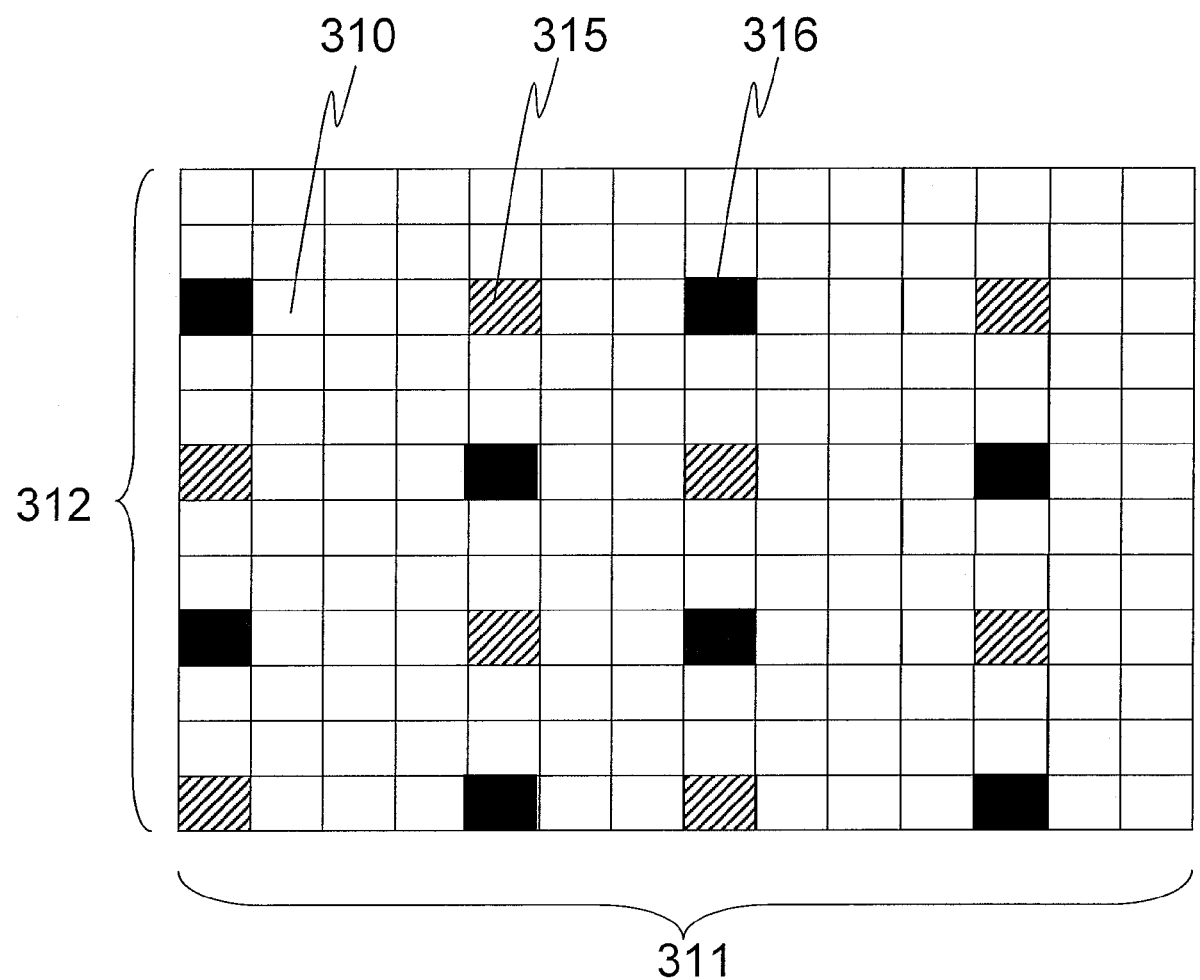
Figure 3D:
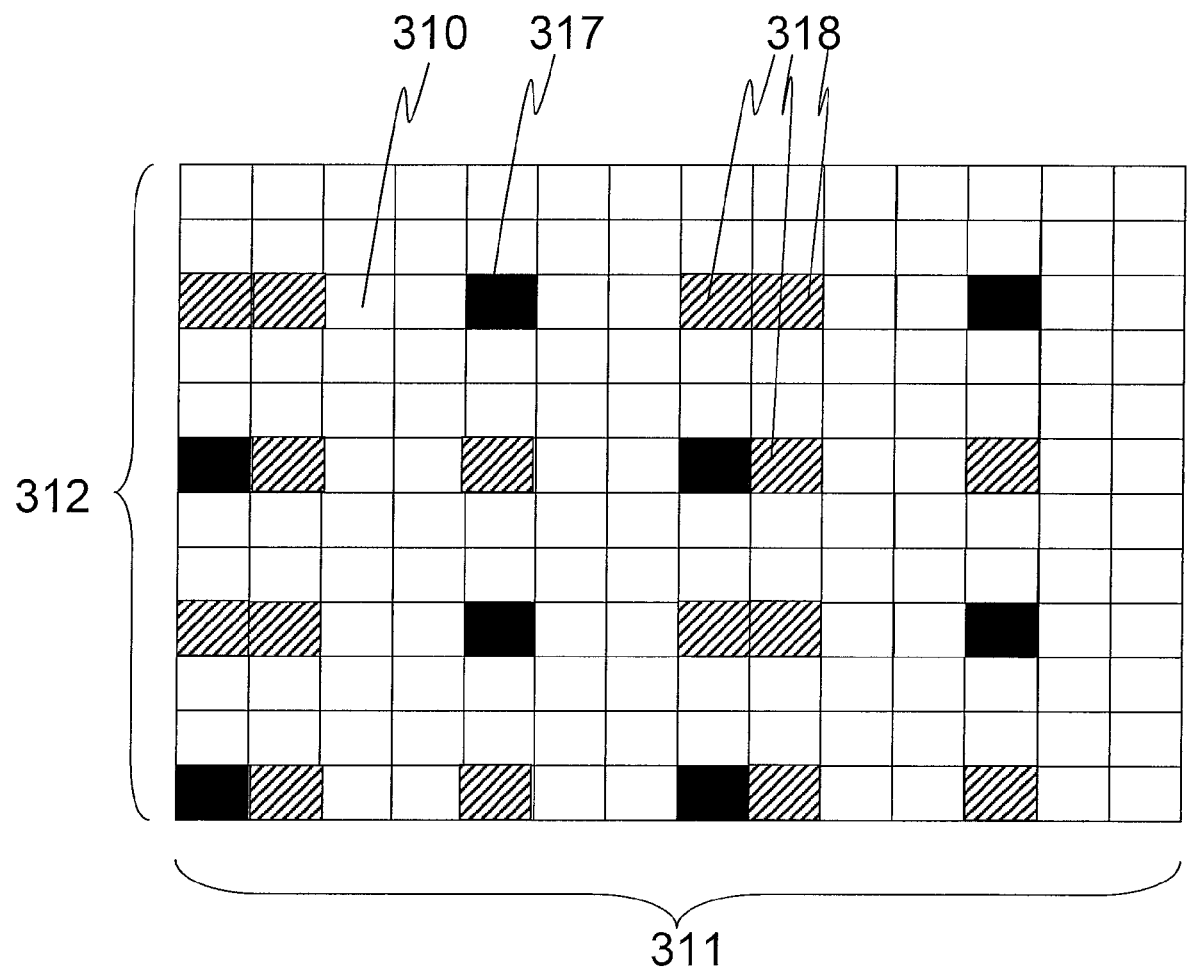
Figure 4:
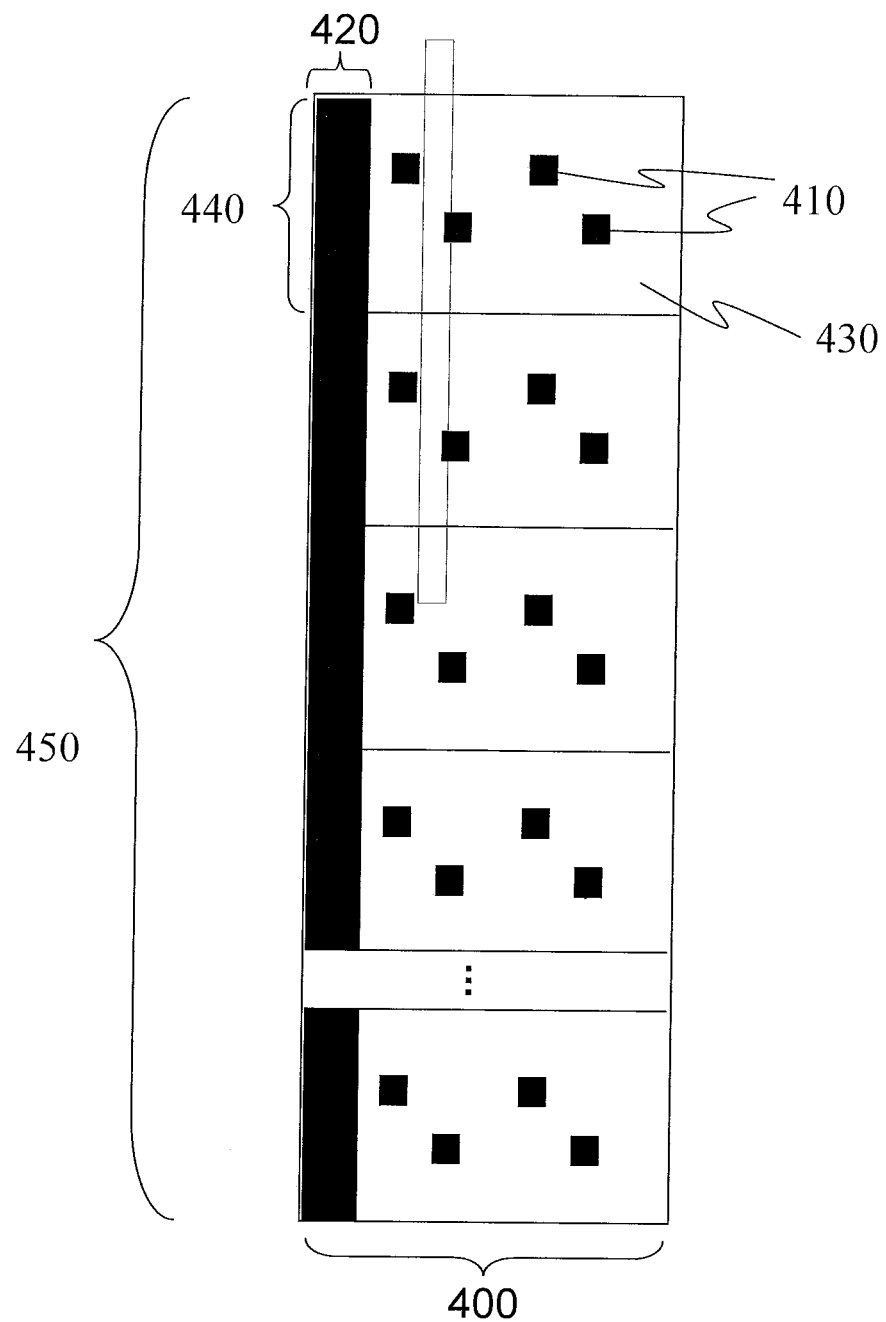
FIG. 4 illustrates schematically a low interference sub frame with an example of a PRS pattern repeated over all PRB.
Figure 5:
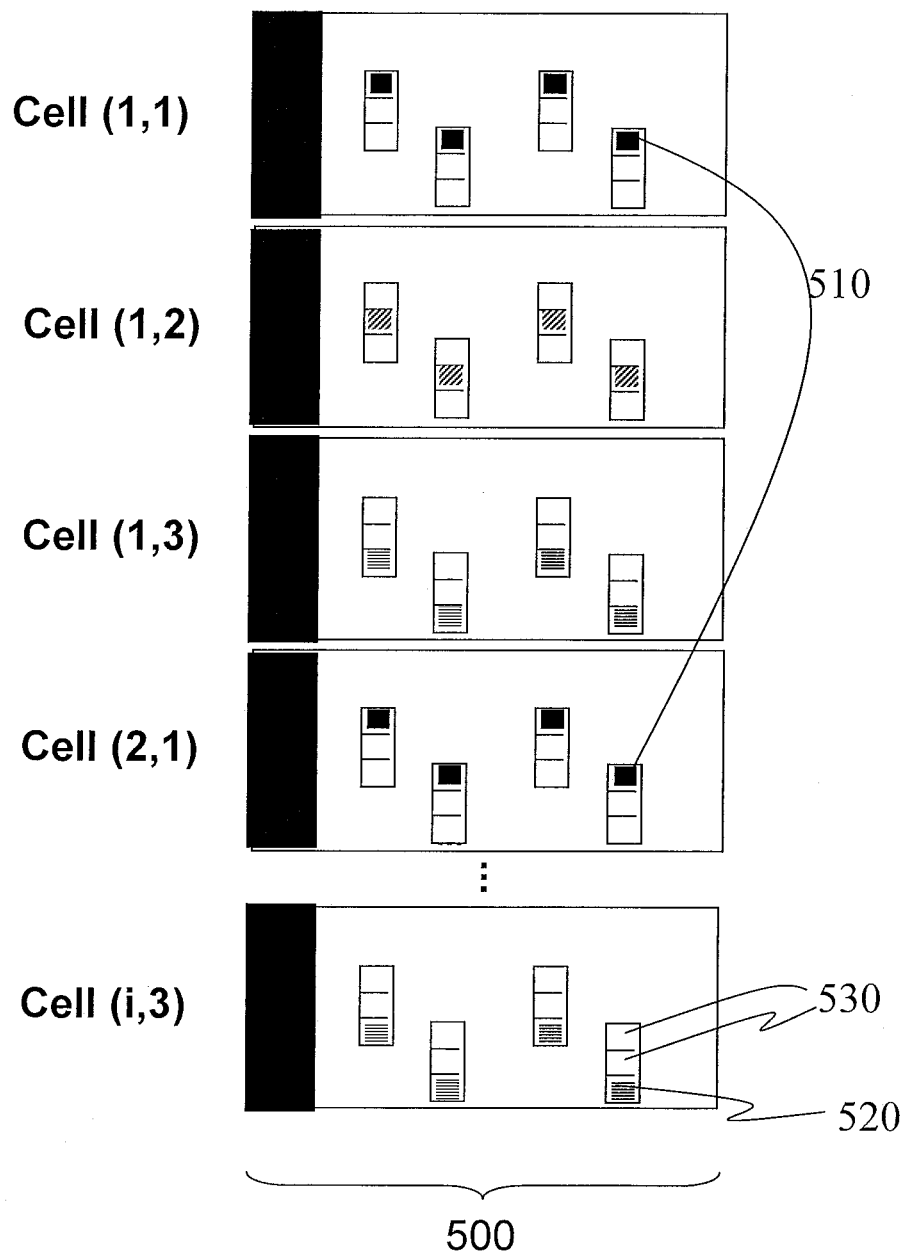
FIG. 5 illustrates schematically aligned low interference sub frames showing the frequency range of one PRB for each cell and PRS RE with a frequency reuse factor of three.

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practiced in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a 3GPP LTE system and to RS (reference signals) for positioning in LTE, i.e. PRS (positioning reference signals). It should though be noted that the invention and its exemplary embodiments may also be applied to other types of OFDM systems, such as WiMax and coming releases of LTE, and are not limited to a specific type of reference signals. The invention and its embodiment are thus also relevant for other radio access technologies with a capability of transmitting signals over a smaller part of the system bandwidth and utilizing reference or pilot signals transmitted in downlink to facilitate UE measurements, and for all wireless devices that perform measurements on reference signals transmitted by the network.

In the present invention, the drawbacks of using the entire system bandwidth for the RS transmission pattern, are addressed by a solution allowing for an adaptation of the bandwidth in which the RS are transmitted, which will hereinafter be referred to as flexible RS bandwidth. For a specific UE that needs to measure a RS from a certain cell, the RBS retrieves the RS transmission bandwidth that corresponds to that cell, this RS transmission bandwidth being smaller than the system bandwidth. The RBS then determines a RS measurement bandwidth based on the RS transmission bandwidth (i.e. within the RS transmission bandwidth), and transmits it to the UE in order for the UE to be able to measure the RS. If the RS measurement bandwidth is the same as the RS transmission bandwidth, i.e. if the RBS determines that the measurement should be done over the entire RS transmission bandwidth, the explicit signaling of the measurement bandwidth to the UE is not needed, as the RS transmission bandwidth is always signaled to the UE. The capability of the UE may restrict the RS measurement bandwidth even further, if the UE only allows a measurement over a smaller bandwidth than the RS measurement bandwidth, determined by the RBS, indicates. The flexible RS bandwidth solution makes it possible to allocate the transmission bandwidth and the measurement bandwidth for the RS in a way that minimizes interference, by choosing to transmit and measure in low-interference PRBs in general. Flexible RS bandwidth may be applied to RS transmitted in downlink in fully aligned (in synchronous networks) or in partially aligned (in asynchronous networks) sub frames.

To support flexible RS bandwidth, it is necessary to make sure that UEs are informed about which PRBs they have to measure on, as stated above. By default, the UE may assume that the RS measurement bandwidth is the entire RS transmission bandwidth, unless the UE is instructed by the network on the bandwidth to measure. In general the RS transmission bandwidth is larger than the RS measurement bandwidth the UE is instructed to measure on.

As mentioned above, the flexible RS bandwidth solution enables the cells to transmit RSs over a smaller part of the system bandwidth. The RS transmission bandwidth can be configured statically, semi-statically or dynamically. In a first exemplary embodiment of the present invention, the RS transmission bandwidth is statically configured in the system, and may e.g. be decided by the network operator. In more advanced solutions, the allocation can be decided by a radio resource management (RRM) algorithm that may also require inter-cell coordination. In a second exemplary embodiment of the present invention, the RS transmission bandwidth is dynamically configured based on a RRM algorithm in the radio base station, without any coordination with neighboring sites. The RBS may in the algorithm e.g. take the interference situation of the own cells into account. In a third exemplary embodiment of the present invention, the RS transmission bandwidth is dynamically configured based on an algorithm that requires inter-cell coordination. The RBS may then coordinate with neighboring RBS, e.g. via the X2 interface between the eNodeBs in LTE. In a fourth exemplary embodiment of the present invention, the RS transmission bandwidth is determined by a controlling node connected to the RBS, and the RBS then needs to retrieve the RS transmission bandwidth from the controlling node. The controlling node could e.g. be the eSMLC node in LTE.

Figure 6:
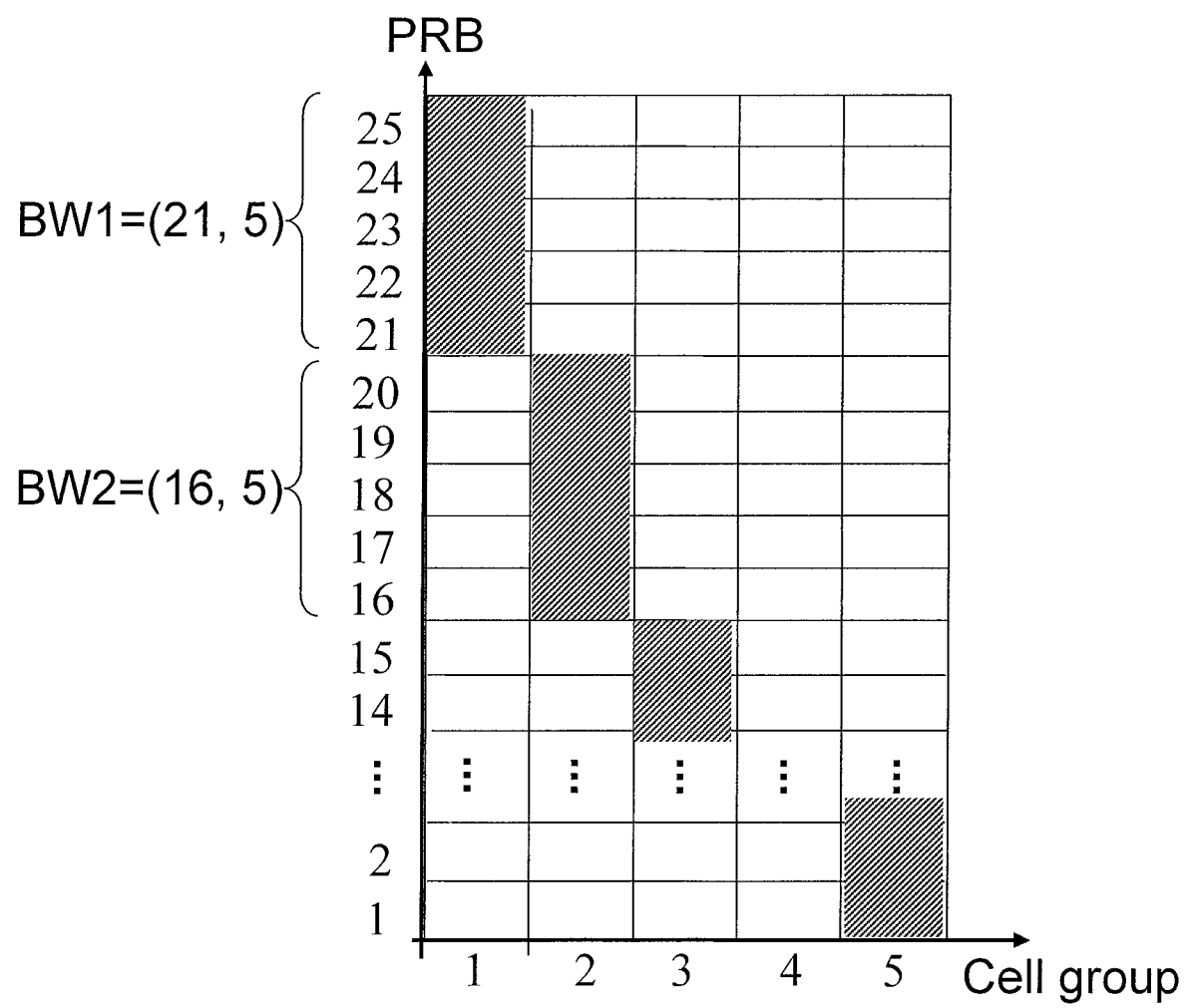
FIG. 6 illustrates schematically an example of grouping of cells where each group is assigned a certain bandwidth for transmitting PRS.

When configuring the flexible RS bandwidth, it is possible to configure different RS bandwidths to different groups of cells. The cells are thus configured to transmit RS only in the PRB associated with the group. An example is illustrated in FIG. 6 where five groups are assumed, each group allocated five consecutive PRBs non-overlapping with the other-groups PRBs, i.e. 25 PRBs in total (for a total of 5 MHz system bandwidth). In the example, each group is allocated a contiguous part of the system band and the allocated bandwidths do not overlap among the groups, although neither of the two is a limitation of the presented idea. In a special case, each group may consist of a single cell. In another special case, all cells are in the same group, and the group is allocated a bandwidth smaller than the total system bandwidth. In general, it is not required that the full bandwidth is allocated, nor that all cells or cell groups have allocated PRBs within the same sub frame. In one embodiment of the present invention, a cell (or cell group) is allocated consecutive PRBs (i.e. a contiguous part of the bandwidth). This is desirable to reduce the UE complexity.

In one embodiment of the present invention, the RS measurement bandwidth is the same for all UE in a cell, i.e. it is cell specific. In an alternative embodiment the RS measurement bandwidth is UE specific. A RS measurement bandwidth that is UE specific may be beneficial in the case of a cell with two UE close to the cell border, on opposite sides of the cell. In those parts of the network the strongest interfering cells may not be the same which means that it may be better to let these UE measure the RS in different parts of the RS transmission bandwidth.

A UE specific RS measurement bandwidth could be decided either in the network, e.g. based on interference statistics, and transmitted to the UE as described above. Alternatively, it could be decided by the UE, transparently to the network. The UE will thus decide whether to use the RS measurement bandwidth transmitted by the network or a RS measurement bandwidth determined by its own. The UE may for example determine the RS measurement bandwidth based on information about the SINR per PRB. A trigger for the UE to decide whether it should reconsider the measurement bandwidth, could be that the RBS does not transmit any RS measurement bandwidth.

In one embodiment of the present invention, the RS measurement bandwidth for a cell is transmitted to the UE by including it in the assistance data. The assistance data is conventionally used by the RBS to transmit cell identities of neighboring cells, in order for the UE to know what cells to measure. The RS measurement bandwidth could e.g. be given in the format (BW_first, BW_length), where BW_first is the index of the first PRB of the RS measurement bandwidth and BW_length is its length in terms of the number of PRBs. Another alternative is to use the format (BW_0, BW_offset), where BW_0 is the centre of the bandwidth and BW_offset is half of the actual RS measurement bandwidth. The benefit of this format is that it results in a shorter message since the maximum value of the second parameter is half as large as that of BW_length parameter.

Another possibility for transmitting the RS measurement bandwidth (as well as the RS transmission bandwidth) is to transmit bitmaps with a relation to cell identities via the assistance data. The bitmap does implicitly indicate the RS transmission/measurement bandwidth corresponding to the related cell. These bitmaps may then be stored by the UE, and the UE can retrieve the RS transmission/measurement bandwidth based on the identity of the cell that needs to be measured. When the RS measurement bandwidth does not change dynamically, i.e. with a unique mapping between cell identity and bandwidth, this solution would make it possible to transmit the bitmaps with a lower frequency, e.g. retransmitted only upon request from the UE or upon changes in the network.

In LTE, the signaling of the RS transmission and measurement bandwidth to the UE can be configured by higher layers and performed over the Radio Resource Control (RRC) protocol or the LTE Positioning Protocol (LPP), and the source of the signaling can be the RBS (eNodeB) or the eSMLC (in this case signalled transparently via the eNodeB), depending on where the decision about the RS measurement bandwidth is taken. The signaling can be broadcast, e.g. as part of system information, or it may be a dedicated signaling. The dedicated signaling may be the same for the whole network, if the RS transmission bandwidth is statically configured and is the same for all cells, e.g. in a 10 MHz system where the RS are configured to be transmitted over 5 MHz centered at the DC carrier in all cells. The signaling may also be cell specific if the RS transmission bandwidth varies from cell to cell.

In some cases, the UE has to re-calculate the RS measurement bandwidth according to the rule: UE_measurement_bandwidth=min(system_bandwidth, RBS_measurement_bandwidth, UE_capability_bandwidth), where system_bandwidth is the system bandwidth applicable for the cell the UE is measuring on, RBS_measurement_bandwidth is the sum of all PRBs indicated to the UE to perform the measurements on, and UE_capability_bandwidth is the bandwidth that the UE is capable to measure. This may be the case e.g. in a network with a macro and a micro cell layer, as the system bandwidth for a micro cell may be smaller than the one for the macro cell. In yet another case, the UE may apply the suggested measurement bandwidth symmetrically around the center frequency.

In another embodiment of the present invention, the interference situation is even further improved by introducing the possibility to suppress data transmission in a sub frame, not over the entire bandwidth, as in the LIS, but over a configurable part of the bandwidth. This solution will hereinafter be referred to as a flexible low interference bandwidth (LIB). The data may e.g. be suppressed only in the part of the bandwidth where the RS are transmitted or measured. The RS transmission bandwidth and the LIB can in general be configured separately and irrespectively of each other, and do not necessarily coincide. The existing LIS definition is a special case with the LIB equal to the entire bandwidth. In another special case, the LIB may also coincide with the RS measurement bandwidth. One advantage of flexible LIB, is that it gives a more efficient spectrum utilization and minimizes capacity loss as data transmissions are suppressed only in a part of the system bandwidth.

LIB is intended to reduce interference on some PRBs in order to improve RS measurements. When the RBS determines the RS measurement bandwidth, it takes into account the LIB of the cell serving the UE as well as neighboring cells LIB, in order for the UE to measure in low interference conditions.

Similar to the flexible RS configuration, LIB configuration can be configured statically, semi-statically or dynamically and can be decided, for example, by the network operator or an RRM algorithm and dynamically in coordination with neighboring RBSs. It may also be a controlling node that determines the LIB configuration. The LIB, however, does not need to be known at the UEs, so the actual LIB does not need to be transmitted to the UE. The RS measurement bandwidth transmitted to the UE will already take into account the LIB. In one example, the RS measurement bandwidth transmitted to the UE may include only PRBs within the LIB.

In an exemplary embodiment of the present invention the determination of the RS measurement bandwidth is also based on interference statistics which may already be available in the RBS and used for other purposes.

In one embodiment of the present invention, the reference signals are the PRS in an LTE system. By using flexible PRS transmission bandwidth, possibly also together with the flexible LIB, the measurement of the PRS used for positioning will be considerably improved through the interference reduction, thus enabling an accurate positioning service. At the same time, the flexible configuration of the bandwidth will make it possible to provide accurate positioning with a minimum of spectrum utilization.

Figure 7A:
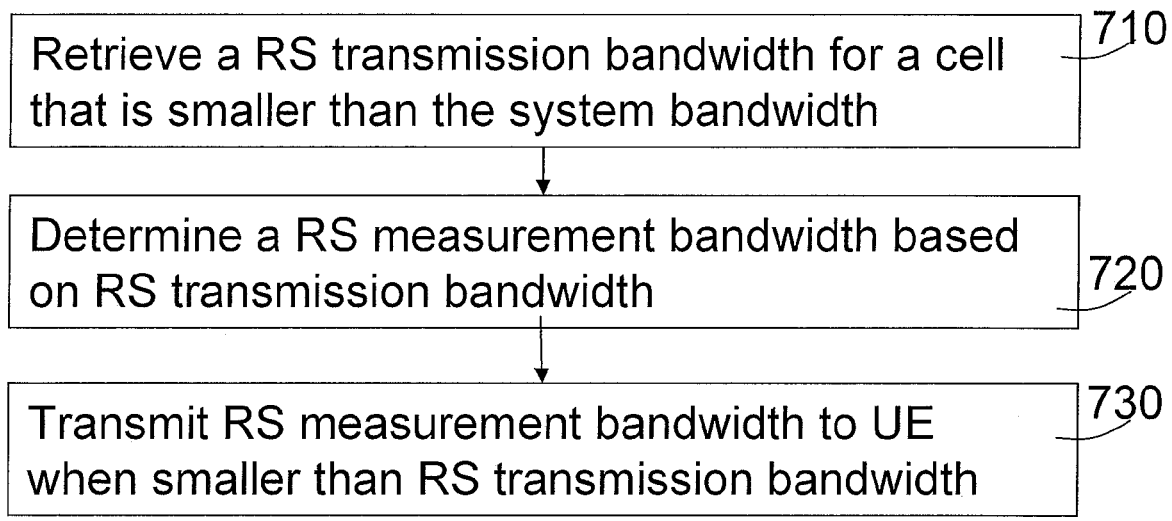
FIGS. 7a-b are flowcharts of the methods in the RBS according to embodiments of the present invention.

FIG. 7a is a flowchart of the method in the RBS according to one embodiment of the present invention. It comprises the following steps:

710: Retrieve the RS transmission bandwidth, smaller than the system bandwidth, for the cell that is to be measured. The RS transmission bandwidth is either statically configured in the RBS or it may be dynamically configured, either by a RRM algorithm in the RBS which may also require a coordination with neighboring RBS. The RS transmission bandwidth may also be retrieved from a connected controlling network node, such as the eSMLC in LTE.

720: Determine the RS measurement bandwidth based on the retrieved RS transmission bandwidth. The RS measurement bandwidth may be smaller than the RS transmission bandwidth, and may be allocated to a low interference part of the RS transmission bandwidth e.g. By default, the RS measurement bandwidth may be equal to the RS transmission bandwidth. The RS measurement bandwidth may be cell specific or UE specific.

730: Transmit the RS measurement bandwidth to the UE, in order for the UE to know where to measure the RS. This is only needed if the RS measurement bandwidth differs from the RS transmission bandwidth, as default is to measure in the RS transmission bandwidth. The signaling of the RS measurement bandwidth may be done e.g. via the assistance data transmitted to the UE.

Figure 7B:
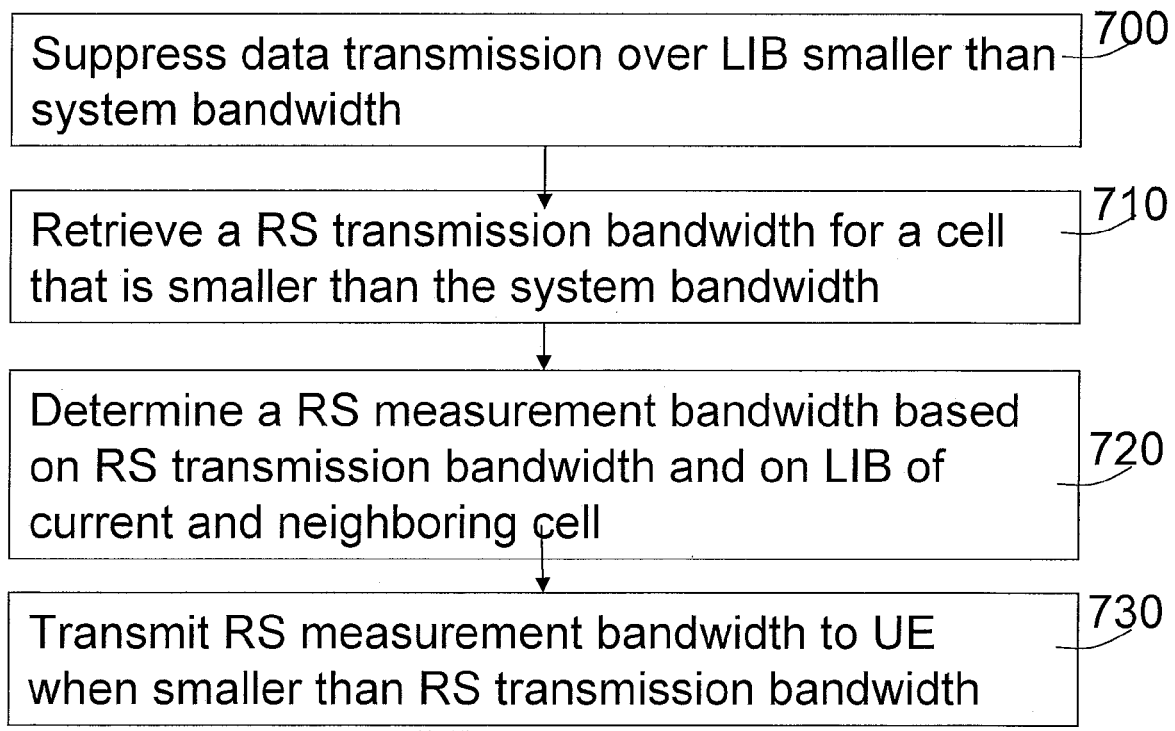

FIG. 7b is a flowchart of the method in the RBS according to another embodiment of the present invention. It comprises the steps illustrated in FIG. 7a described above, preceded by the new step 700 of suppressing the data transmission in a so called LIB of a sub frame, where the LIB is smaller than the system bandwidth. In this embodiment, the step 720 of determining the RS measurement bandwidth will be based, not only on the RS transmission bandwidth, but also on the LIB of the current and the neighboring cell(s). The purpose is to allow for a reduced interference when measuring the RS, e.g. for positioning.

Figure 8A:
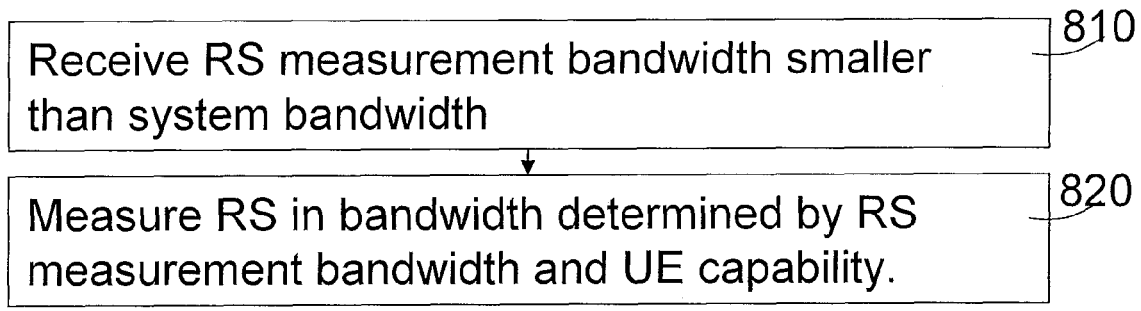
FIGS. 8a-b are flowcharts of the methods in the UE according to embodiments of the present invention.

FIG. 8a is a flowchart of a the method in the UE according to one embodiment of the present invention. It comprises the following steps:

810: Receive an RS measurement bandwidth for a cell, where the RS measurement bandwidth is smaller than the system bandwidth.

820: Measure the RS in a bandwidth determined by the received RS measurement bandwidth and by the UE capability. If the RS measurement bandwidth indicates 15 MHz and the UE capability only allows for measuring over 10 MHz bandwidth, the RS measurement bandwidth signaled by the RBS cannot be used. The UE must then adapt the measurement bandwidth to what is possible.

Figure 8B:
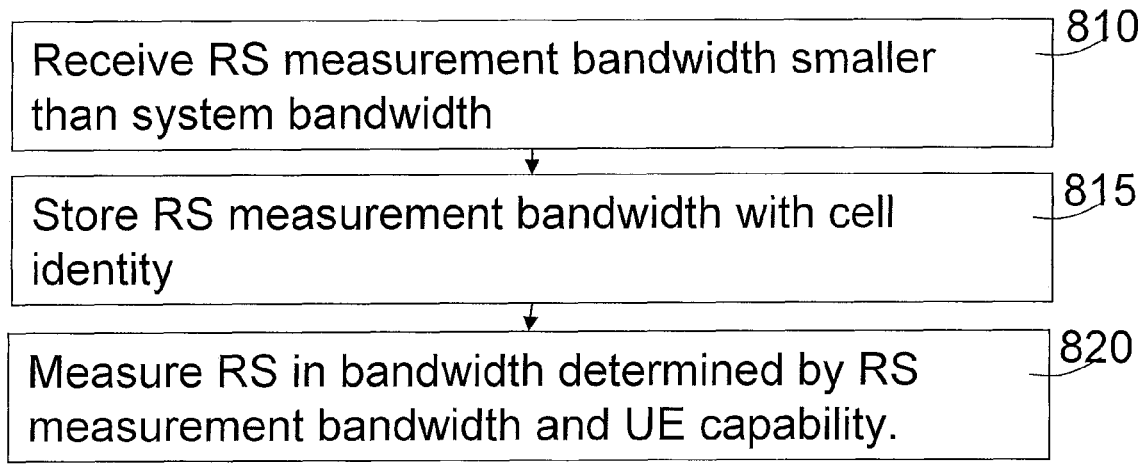

FIG. 8b is a flowchart of a the method in the UE according to another embodiment of the present invention. It comprises the further step of storing 815 the RS measurement bandwidth for a cell together with the cell identity, in e.g. a bitmap. The UE may then retrieve the RS measurement bandwidth from the stored bitmap based on a cell identity, when it needs to measure the RS for the corresponding cell.

Figure 9:
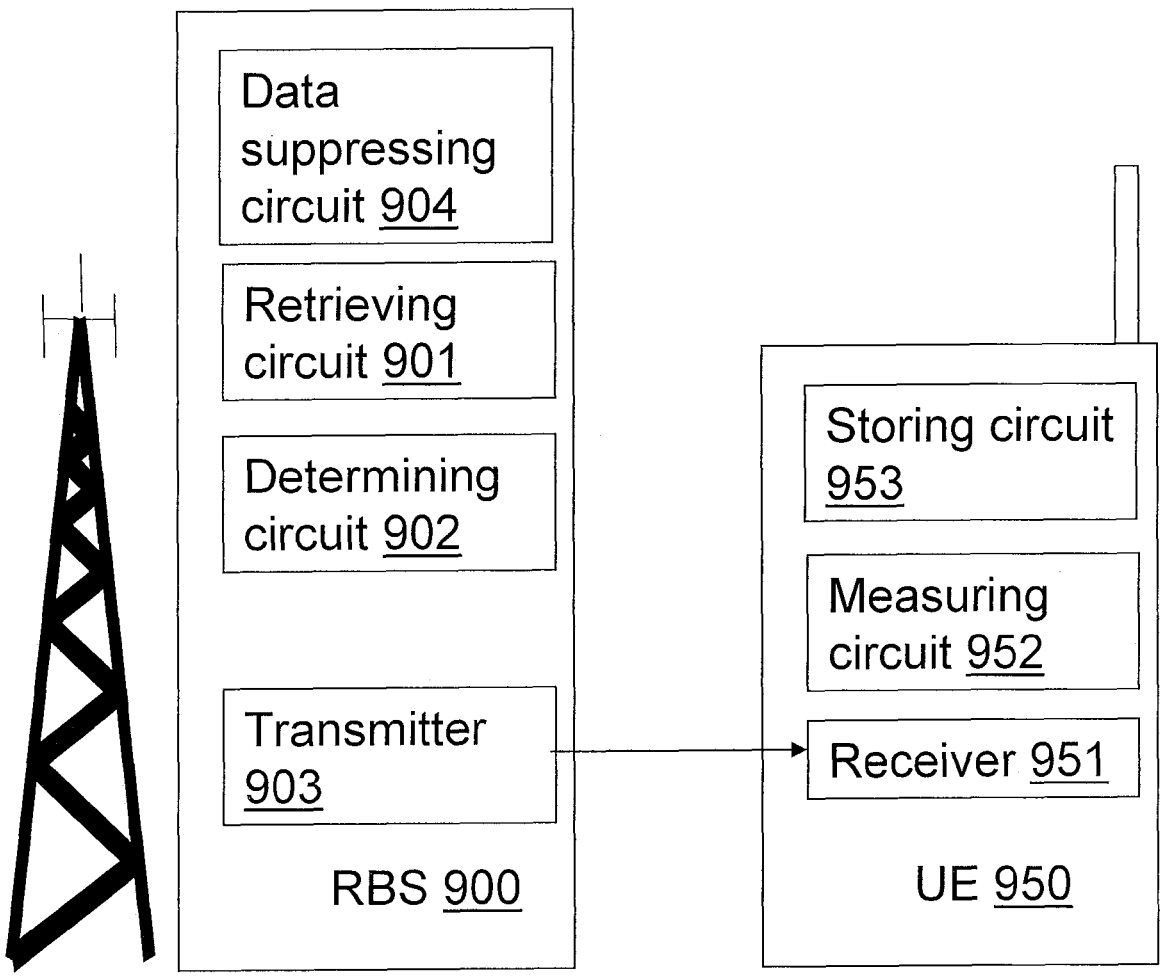
FIG. 9 illustrates schematically the RBS and the UE according to embodiments of the present invention.

Schematically illustrated in FIG. 9, and according to embodiments of the present invention, is the RBS 900. It comprises a retrieving circuit 901, for retrieving the RS transmission bandwidth, which is either statically or dynamically configured and is retrieved either from the RBS itself or from a controlling network node connected to the RBS. The RBS 900 also comprises a determining circuit 902 for determining the RS measurement bandwidth, based on the retrieved RS transmission bandwidth, and a transmitter 903 for transmitting the RS measurement bandwidth to the UE, e.g. via the assistance data, when it differs from the RS transmission bandwidth. According to one embodiment, the RBS also comprises a data suppressing circuit 904 for suppressing data transmissions in a sub frame over a LIB smaller than the system bandwidth. In this embodiment the determining circuit 902 is adapted to determine the RS measurement bandwidth also based on the LIB of the serving cell and of neighboring cells.

Also illustrated in FIG. 9, and according to embodiments of the present invention, is the UE 950. It comprises a receiver 951 for receiving the RS measurement bandwidth, e.g. in the assistance data from the RBS, and a measuring circuit 952 for measuring the RS in the bandwidth determined by the received RS measurement bandwidth and the UE capability. In one embodiment of the present invention, the UE 950 also comprises a storing circuit 953 for storing the RS measurement bandwidth together with the cell identity, in order for the UE to be able to retrieve the RS measurement bandwidth when needed.

The above mentioned and described embodiments are only given as examples and should not be limiting to the present invention. Other solutions, uses, objectives, and functions within the scope of the invention as claimed in the accompanying patent claims should be apparent for the person skilled in the art.

Abbreviations

3GPP 3rd Generation Partnership Project
A-GPS Assisted GPS
BS Base Station
CRS Cell-specific Reference Signal
eNodeB evolved Node B
eSMLC evolved SMLC
GPS Global Positioning System
GSM Global System for Mobile communications
IPDL Idle Period Downlink
LIB Low-Interference Bandwidth
LIS Low-Interference Subframe
LPP LTE Positioning Protocol
LTE Long-Term Evolution
MAC Medium Access Control
MBSFN Multicast Broadcast Single Frequency Network
MBMS Multimedia Broadcast Multicast Service
OFDM Orthogonal Frequency Division Multiplexing
OTD Observed Time Difference
OTDOA Observed Time Difference Of Arrival
PDSCH Physical Downlink Shared Channel
PRB Physical Resource Block
PRS Positioning Reference Signal
PSS Primary SS
RE Resource Element
RRM Radio Resource Management
RS Reference Signal
SINR Signal-to-Interference plus Noise Ratio
SMLC Serving Mobile Location Center
SS Synchronization Signal
SSS Secondary SS
TDOA Time Difference of Arrival
UE User Equipment
UMTS Universal Mobile Telecommunications System

The invention claimed is:

1. A method implemented by a radio base station for reference signal, RS, measurements in an OFDM system, the radio base station configured to transmit to a user equipment over a defined system bandwidth, the method comprising:
retrieving a RS transmission bandwidth for a cell, said RS transmission bandwidth being smaller than the system bandwidth,
determining a RS measurement bandwidth based on the RS transmission bandwidth, and
transmitting the RS measurement bandwidth to a user equipment when said RS measurement bandwidth is smaller than the RS transmission bandwidth, in order for the user equipment to measure the RS of the cell.

2. The method of claim 1, wherein the RS transmission bandwidth is statically configured in the radio base station.

3. The method of claim 1, wherein the RS transmission bandwidth is dynamically configured based on a first algorithm in the radio base station.

4. The method of claim 1, wherein the RS transmission bandwidth is dynamically configured based on coordination with a neighbouring radio base station.

5. The method of claim 1, wherein the RS transmission bandwidth is retrieved from a controlling network node connected to the radio base station.

6. The method of claim 1, wherein the RS transmission bandwidth corresponds to a contiguous part of the system bandwidth.

7. The method of claim 1, wherein the RS measurement bandwidth is cell specific.

8. The method of claim 1, wherein the RS measurement bandwidth is user equipment specific.

9. The method of claim 1, wherein transmitting the RS measurement bandwidth comprises including the RS measurement bandwidth in assistance data transmitted to the user equipment.

10. The method of claim 1, further comprising suppressing data transmission in a sub frame over a first low interference bandwidth for the cell serving the user equipment, said first low interference bandwidth being smaller than the system bandwidth, and wherein determining a RS measurement bandwidth comprises determining a RS measurement bandwidth also based on said first low interference bandwidth and on a second low interference bandwidth of a neighbouring cell.

11. The method of claim 10, wherein said first and second low interference bandwidth are statically configured in the radio base station.

12. The method of claim 10, wherein said first and second low interference bandwidth are dynamically configured based on a second algorithm in the radio base station.

13. The method of claim 10, wherein said first and second low interference bandwidth are dynamically configured based on coordination with a neighbouring radio base station.

14. The method of claim 10, wherein said first and second low interference bandwidth are retrieved from a controlling network node connected to the radio base station.

15. The method of claim 10, wherein said first and second low interference bandwidth correspond to contiguous parts of the system bandwidth.

16. The method of claim 1, wherein determining a RS measurement bandwidth comprises determining a RS measurement bandwidth also based on interference statistics.

17. The method of claim 1, wherein the RS measurements are used for positioning in an LTE system.

18. A radio base station for an OFDM system that is configured to transmit to a user equipment over a defined system bandwidth, the radio base station comprising:
a retrieving circuit configured to retreive a RS transmission bandwidth for a cell, said RS transmission bandwidth being smaller than the system bandwidth,
a determining circuit configured to determine a RS measurement bandwidth for the cell based on the RS transmission bandwidth, and
a transmitter configured to transmit the RS measurement bandwidth to a user equipment when said RS measurement bandwidth is smaller than the RS transmission bandwidth, in order for the user equipment to measure the RS of the cell.

19. The radio base station of claim 18, wherein the RS transmission bandwidth is statically configured in the radio base station.

20. The radio base station of claim 18, wherein the RS transmission bandwidth is dynamically configured based on a first algorithm in the radio base station.

21. The radio base station of claim 18, wherein the RS transmission bandwidth is dynamically configured based on coordination with a neighbouring radio base station.

22. The radio base station of claim 18, wherein the retrieving circuit is configured to retrieve the RS transmission bandwidth from a controlling network node connected to the radio base station.

23. The radio base station of claim 18, wherein the RS measurement bandwidth is cell specific.

24. The radio base station of claim 18, wherein the RS measurement bandwidth is user equipment specific.

25. The radio base station of claim 18, wherein the RS transmission bandwidth corresponds to a contiguous part of the system bandwidth.

26. The radio base station of claim 18, wherein the transmitter is configured to transmit the RS measurement bandwidth by including the RS measurement bandwidth in assistance data transmitted to the user equipment.

27. The radio base station of claim 18, further comprising a data suppressing circuit configured to suppress data transmission in a sub frame over a first low interference bandwidth for the cell serving the user equipment, said first low interference bandwidth being smaller than the system bandwidth, and wherein the determining circuit is further configured to determine the RS measurement bandwidth also based on said first low interference bandwidth and on a second low interference bandwidth of a neighbouring cell.

28. The radio base station of claim 27, wherein said first and second low interference bandwidth are statically configured in the radio base station.

29. The radio base station of claim 27, wherein said first and second low interference bandwidth are dynamically configured based on a second algorithm in the radio base station.

30. The radio base station of claim 27, wherein said first and second low interference bandwidth are dynamically configured based on coordination with a neighbouring radio base station.

31. The radio base station of claim 27, wherein the retrieving circuit is configured to retrieve said first and second low interference bandwidth from a controlling network node connected to the radio base station.

32. The radio base station of claim 27, wherein said first and second low interference bandwidth correspond to contiguous parts of the system bandwidth.

33. The radio base station of claim 27, wherein the determining circuit is further configured to determine the RS measurement bandwidth also based on interference statistics.

34. The radio base station of claim 27, wherein the RS measurements are used for positioning in an LTE system.

* * * * *